F. R. GLASENER.
COLLAPSIBLE SEAT OR BED.
APPLICATION FILED JULY 26, 1920.

1,379,683.

Patented May 31, 1921.

Inventor,
F. R. Glasener, by
G. C. Kennedy
Attorney.

UNITED STATES PATENT OFFICE.

FRANK RUSSELL GLASENER, OF ROCK FALLS, IOWA.

COLLAPSIBLE SEAT OR BED.

1,379,683.  Specification of Letters Patent.  Patented May 31, 1921.

Application filed July 26, 1920. Serial No. 398,947.

*To all whom it may concern:*

Be it known that I, FRANK RUSSELL GLASENER, a citizen of the United States of America, and a resident of Rock Falls, Cerro Gordo county, Iowa, have invented certain new and useful Improvements in Collapsible Seats or Beds, of which the following is a specification.

My invention relates to improvements in collapsible seats or beds, and the object of my improvement is to supply for use in being removably mounted upon a vehicle seat or other supporting means, a device of this class which can be extended either longitudinally for use as a bed for a child, and having sides foldable thereupon when collapsed, with extension devices arranged along said sides, or which can be employed as a child's seat when unextended longitudinally, the invention being adapted when entirely collapsed to occupy but a small space, thus suiting it for convenient storage or transportation.

Figure 1:
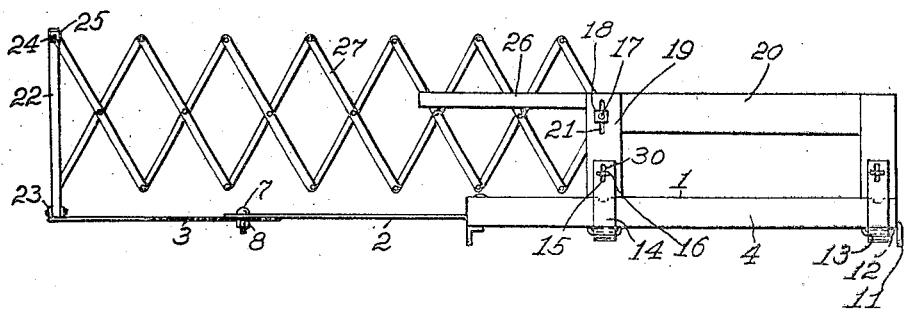
Figures 2, 3:
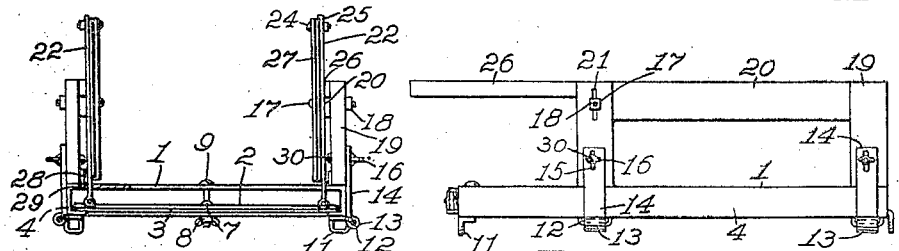
Figure 4:
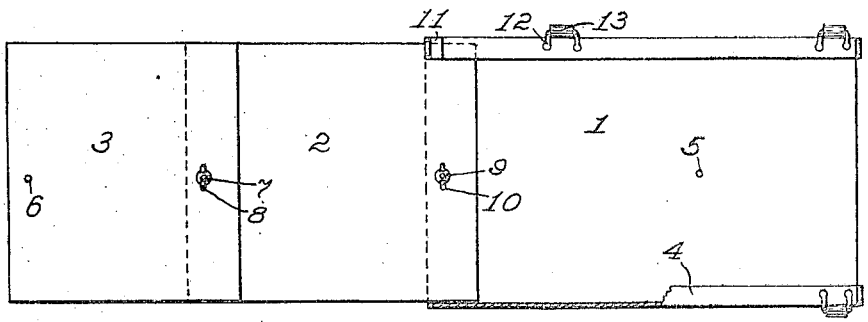

This object I have accomplished by the means which are hereinafter described and claimed, and which are illustrated in the accompanying drawings, in which Figure 1 is a side elevation of my improved device with all its parts fully extended, for use as a child's bed, and Fig. 2 is a like side elevation, showing the extension base and the lazy tongs along the sides collapsed, the foldable sides being secured in upright positions, so that the device may be used as a child's seat. Fig. 3 is an elevation of the extension end part of the device, and Fig. 4 is a plan of the under side of the device, showing the extension base parts as fully extended and as secured together and to the base-plate.

The numeral 1 denotes a base-plate, which may be made from either wood or metal, but preferably of a metal plate whose longitudinal edges are turned down and then inwardly to provide shelves or guideways 4. The numeral 11 denotes depending ears fixed upon the ends of the guideways 4 to receive straps or cords which may be employed to removably secure said base-plate upon part of the seat or other part of a motor-car, or other vehicle or structure.

The numeral 2 denotes an extension base-plate slidingly mounted on the guideways 4, and the plates 1 and 2 have orifices adapted when the plates are extended upon each other, to receive a removable bolt 9, secured by a wing-nut 10.

The numeral 3 denotes another extension plate which slides along the under face of the plate 2. This plate and the plate 2 have orifices to removably receive a bolt 7 secured by a wing-nut 8 when the plate 3 is extended.

The numeral 12 denotes lateral ears fixed on the under sides of the guideways 4, forming parts or pintles of hinges upon which the scrolled parts 13 of hinge-members 14 are pivotally mounted. This permits said members 14 to be swung under the base-plate 1 closely thereto, or to stand upright along the vertical outer faces of said guideways as shown.

The numeral 19 denotes standards which have bolts 30 extended outwardly through vertical slots 15 in the hinge members 14 to be secured in an adjusted position vertically thereon by means of wing-nuts 16. Adjacent the lower ends of the standards small openings 29 are made in the base-plate 1 to releasably receive the dogs or fixed catches 28 on the said standards, to lock the latter in their erected positions. The tops of the standards on each side are connected by a longitudinal bar 20 having an extension part 26.

The numeral 27 denotes lazy-tongs which are positioned within and alongside the parts 26 and the standards 19 longitudinally. In each set of lazy-tongs, one of the intermediate pintles 17 is elongated enough and terminally threaded to extend removably and adjustably outwardly through a bearing slot 21 in an adjacent standard 19 and secured thereto by a nut 18.

Each lazy-tongs 27 has at its outer end a pintle-bolt connection 24 with the upper orificed end of a standard 22, and is releasably secured thereto by a nut 25. The lower end of each standard 22 is pivotally mounted between lugs 23 on the outer end of the extension-plate 3 to swing inwardly and lie upon the upper surface of said plate when the lazy-tongs is disconnected from the standard 19. Clearance room, as shown in Fig. 3, is provided under the plate 1 for the two lazy-tongs when so folded upon each other and when the plates 2 and 3 are mounted thereunder after the bolts 7 and 9 are removed and replaced in other orifices 5 and 6 in the plates 1 and 3.

Fig. 2 shows the device with the extension-plates and the collapsed and folded lazy-tongs retracted under the plate 1 to be used as a seat. In Fig. 1 these movable parts are fastened in extended positions, the lazy-tongs inclosing the sides of the plates 2 and 3, for use as a child's bed. When not in use, the catches 28 of the side parts 19 and 20 may be released from the plate 1 and said parts swung downwardly and under said plate, which reduces it to a very small compass.

The device is convenient for use as a collapsible seat or bed on a motor-car for a child, as a pad or mattress may be placed upon said base-plates as cushioning means.

Having described my invention, what I claim as new and desire to secure by Letters Patent, is:

1. In a device of the character described, a base-plate having guideways, an extension therefor movable along said guideways and composed of planar superposed slidingly connected members, and means to secure them in either extended or in collapsed positions.

2. In a device of the character described, a base-plate having longitudinal marginal guideways, a two-part extension comprising planar superposed members slidingly connected together and to the base-plate, and orificed ears upon said base-plate for connecting it to some supporting-means.

3. In a device of the character described, a base-plate, longitudinally connected standards hinged upon opposite longitudinal parts of the base-plate to swing outwardly and downwardly only under the base-plate and vertically adjustable relative thereto, and co-mating engaging-means on both of them for releasably securing said standards to the base-plate when erected thereon.

4. In a device of the character described, a base-plate having marginal hinges, longitudinally-connected standards adjustably mounted upon said hinges and adapted to be swung by the latter to and from positions of erection on the base-plate, and longitudinally arranged collapsible structures releasably connected to said connected standards to supply side closures along the base-plate.

5. In a device of the character described, a base-plate provided with ears for use in mounting it removably upon a supporting-means, standards mounted along its longitudinal edges, and lazy-tongs releasably connected at one end of each to said standards and extensibly movable beyond the base-plate.

6. In a device of the character described, a base-plate, foldable standards mounted along its longitudinal edges, an extensible device mounted on said base-plate to lengthen it, and a pair of lazy-tongs transversely pivotally foldably mounted on said extensible device and movable over both said base-plate and extension.

7. In a device of the character described, a base-plate, a two part extension-device slidably mounted thereunder, means for releasably securing the parts of the latter to each other and to the former in an extended position, standards adjustably hingedly mounted on and releasably secured to the longitudinal edges of the base-plate, longitudinal bars fixedly connecting said standards, lazy-tongs mounted along the sides of said extension-device and said standards and connected to the former for extension along the sides of both the base-plate and extension-plate, and removable connections between the inner ends of the lazy-tongs and said standards.

Signed at Rock Falls, Iowa, this 26 day of June, 1920.

FRANK RUSSELL GLASENER.